(12) United States Patent
Yamagishi et al.

(10) Patent No.: US 7,156,195 B2
(45) Date of Patent: Jan. 2, 2007

(54) COOLING SYSTEM FOR ELECTRIC MOTOR OF VEHICLE

(75) Inventors: Yasuhiko Yamagishi, Yokosuka (JP); Ryuichi Idoguchi, Yokohama (JP); Hiroyuki Hirano, Kanagawa-ken (JP); Tamotsu Kawamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 238 days.

(21) Appl. No.: 10/689,836

(22) Filed: Oct. 22, 2003

(65) Prior Publication Data

US 2004/0134693 A1  Jul. 15, 2004

(30) Foreign Application Priority Data

Oct. 23, 2002 (JP) .............................. 2002-308567
Sep. 30, 2003 (JP) .............................. 2003-341960

(51) Int. Cl.
 *B60K 1/00* (2006.01)
(52) U.S. Cl. ..................... 180/65.1; 310/54; 310/60 A; 310/61
(58) Field of Classification Search ............... 180/65.1, 180/229; 310/52, 53, 54, 58, 61, 64, 60 A
See application file for complete search history.

(56) References Cited

U.S. PATENT DOCUMENTS

| | | | |
|---|---|---|---|
| 4,203,044 A | 5/1980 | Linscott, Jr. | |
| 4,418,777 A | 12/1983 | Stockton | |
| 4,728,840 A * | 3/1988 | Newhouse | 310/113 |
| 5,111,090 A | 5/1992 | Otake et al. | |
| 5,457,363 A | 10/1995 | Yoshii et al. | |
| 6,087,744 A * | 7/2000 | Glauning | 310/58 |
| 6,116,877 A * | 9/2000 | Takeuchi et al. | 418/88 |
| 6,329,731 B1 * | 12/2001 | Arbanas et al. | 310/52 |
| 6,437,468 B1 * | 8/2002 | Stahl et al. | 310/61 |
| 6,626,649 B1 * | 9/2003 | Cowans | 417/366 |
| 6,707,180 B1 * | 3/2004 | Hattori et al. | 310/61 |
| 6,750,572 B1 * | 6/2004 | Tornquist et al. | 310/54 |
| 6,897,581 B1 * | 5/2005 | Doherty et al. | 310/52 |

FOREIGN PATENT DOCUMENTS

JP  9-182375 A  7/1997

OTHER PUBLICATIONS

R.L. Willis et al., "Ford Next Generation Electric Vehicle Powertrain", International Electric Vehicle Symposium, Dec. 5-7, 1994, San Francisco, vol. 1, Symp. 12, pp. 449-458.
Masahiro Hasebe, "Highly Efficient Vehicle Drive System", International Electric Vehicle Symposium, Oct. 13, 1996, vol. 2, Symp. 13, pp. 562-568.

* cited by examiner

*Primary Examiner*—Christopher P. Ellis
*Assistant Examiner*—Brian Swenson
(74) *Attorney, Agent, or Firm*—Foley & Lardner LLP (57) ABSTRACT

A cooling system for an electric motor of a vehicle comprises an electric motor which drives the vehicle, a reduction gear which adjusts a driving force of an output shaft of the electric motor and transmits the driving force to a drive shaft, and an in-shaft refrigerant passage provided in a shaft of the reduction gear and the output shaft of the electric motor. In the cooling system, a refrigerant which has passed through the in-shaft refrigerant passage is collected outside a motor case housing the electric motor, and is circulated.

20 Claims, 8 Drawing Sheets

COOLING SYSTEM FOR ELECTRIC MOTOR OF VEHICLE

BACKGROUND OF THE INVENTION

1. Field of the Invention

The present invention relates to a cooling system for an electric motor of a vehicle, the cooling system including an electric motor for driving the vehicle, and a reduction gear for adjusting a driving force of an output shaft of the electric motor to transmit the driving force to a drive shaft.

2. Description of the Related Art

In an electric motor for driving an electric vehicle, a rotor generates heat due to an eddy current loss and a hysteresis loss, which occur in an iron core thereof, and therefore, members of the electric motor are deteriorated due to temperature rise. Accordingly, a drive time of the electric motor needs to be controlled in order to suppress temperature rise.

Regarding this problem, there has been known a cooling system for cooling the rotor by flowing a refrigerant such as oil through the inside of the output shaft of the electric motor or the inside of the iron core of the rotor (refer to Japanese Patent Application Laid-Open No. H9-182375 (published in 1997)).

In the conventional cooling system, the refrigerant after being used for cooling is taken from the inside of the rotor to the inside of a motor case, and collected inside the motor case to be circulated.

SUMMARY OF THE INVENTION

However, with the conventional configuration of collecting the refrigerant inside the motor case, in the case of applying a motor using magnets, such as a synchronous motor, the refrigerant is brought into contact with the magnets. Since the magnets have a lower heat resistance than the other constituent members, there have been problems in that the magnets are deteriorated by contact with the refrigerant having a high temperature after being used for cooling, and that the magnets are altered in quality due to additives and the like contained in the refrigerant.

Moreover, there may be some cases wherein a foreign object such as metal powder is mixed into the refrigerant due to abrasion inside a reduction gear, particularly when a refrigerant cooling passage is common to the reduction gear and to an electric motor. When the refrigerant into which the metal foreign object is mixed is brought into contact with the magnets, there has been a problem in that the metal foreign object in the refrigerant becomes attached to the magnets, thus deteriorating the magnets.

The present invention was made in consideration of the above-described problems. It is an object of the present invention to provide a cooling system for an electric motor of a vehicle, which is capable of avoiding deterioration and alteration of the magnets attributable to the refrigerant.

According to one aspect of the present invention, there is provided a cooling system for an electric motor of a vehicle, comprising: an electric motor which drives the vehicle; a reduction gear which adjusts a driving force of an output shaft of the electric motor and transmits the driving force to a drive shaft; and an in-shaft refrigerant passage provided in a shaft of the reduction gear and the output shaft of the electric motor, wherein a refrigerant which has passed through the in-shaft refrigerant passage is collected outside a motor case housing the electric motor, and is circulated.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

A first embodiment will be described based on FIGS. 1 and 2.

Note that, in this embodiment, a combination of an electric motor and a reduction gear, which includes a shaft having a refrigerant passage mutually communicating with the electric motor and the reduction gear, will be described by taking a coaxial synchronous motor as an example.

In addition, the case of applying oil-cooling by use of oil as a refrigerant common to the electric motor and the reduction gear will be described. In FIG. 1, the arrows indicate a flow of the cooling oil.

Figure 1:
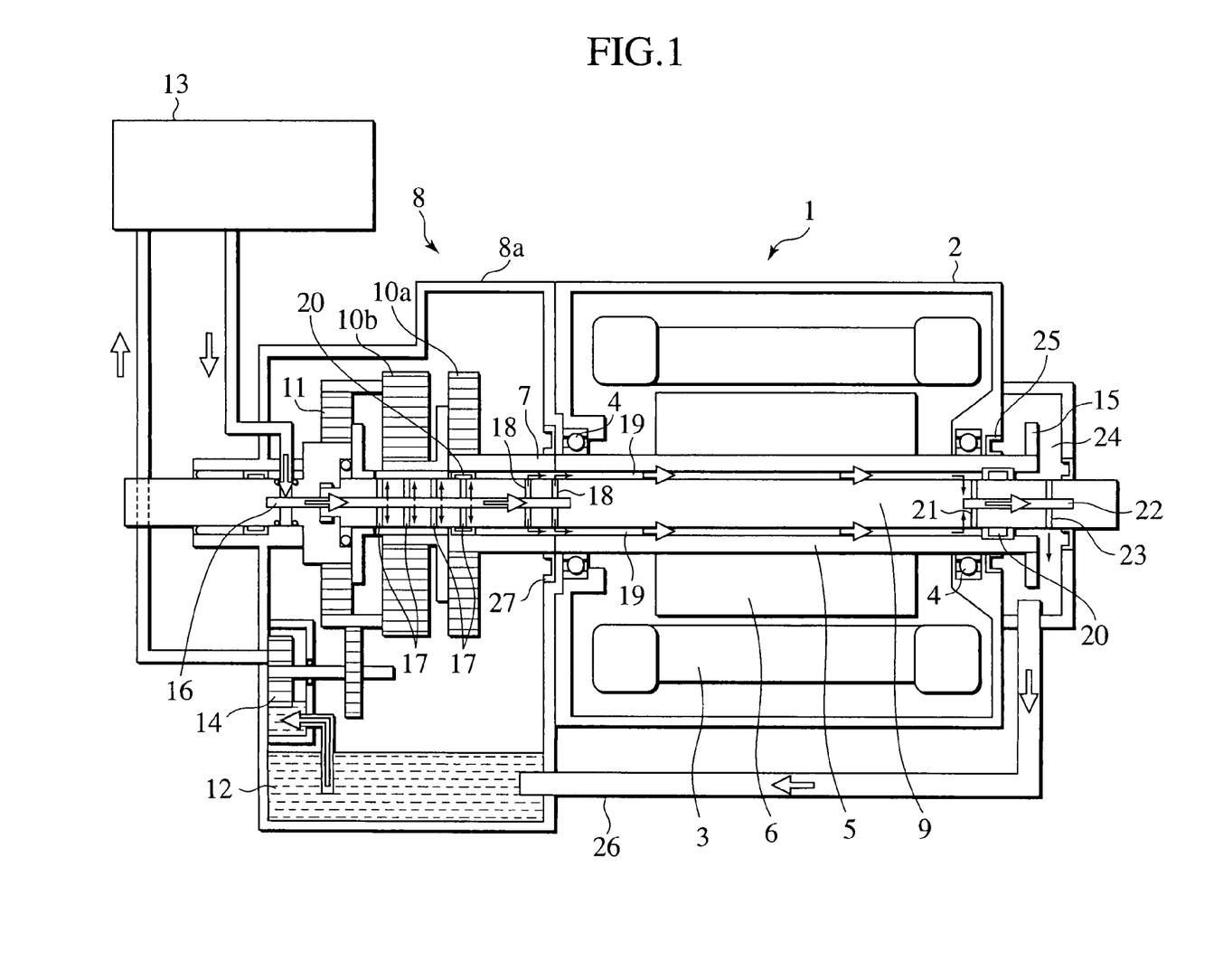
FIG. 1 is a cross-sectional view of an electric motor and a reduction gear in an axial direction in a first embodiment of the present invention.
Figure 2:
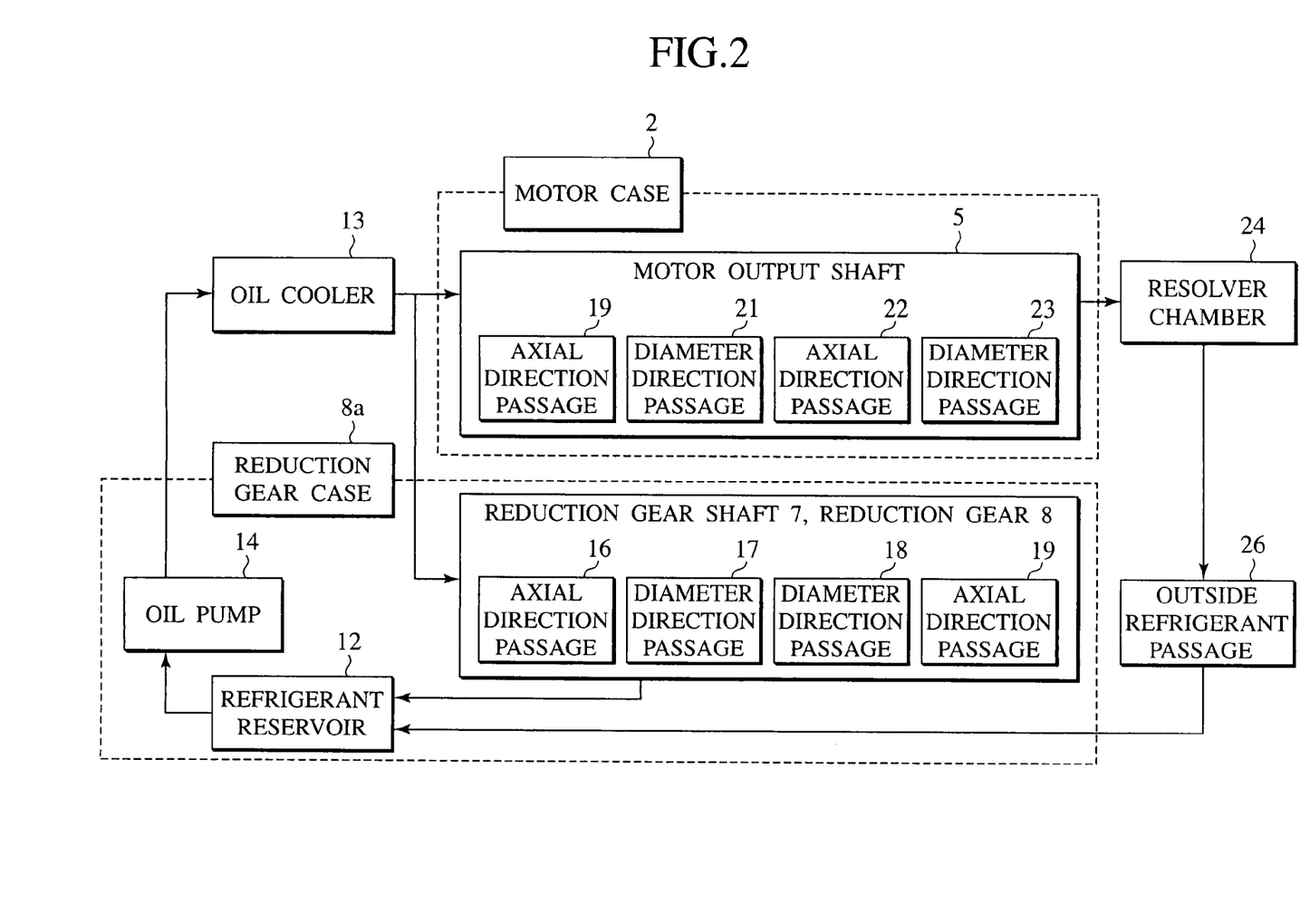
FIG. 2 is a block diagram showing flow passages of cooling oil in the first embodiment of the present invention.

Referring to FIG. 1, the electric motor 1 for driving a vehicle is housed in the motor case 2.

The electric motor 1 includes plural sets of the stator coils 3 provided inside the motor case 2 in a rotating direction, the motor output shaft 5 rotatably supported by the bearings 4 attached to the motor case 2, and the rotor 6 provided with a plurality of permanent magnets corresponding to the number of poles, the rotor 6 being fixed to the motor output shaft 5.

The reduction gear shaft 7 is coaxially connected to the motor output shaft 5. The reduction gear 8 includes a pair of the reduction gears (planetary gears) 10a and 10b, and the differential gear 11. The reduction gear 10a is attached onto the reduction gear shaft 7. The reduction gear 10b is attached to an output carrier of the reduction gear 10a and to the differential gear 11. They have a role of adjusting a driving force of the motor output shaft 5 and transmitting the driving force to the drive shaft 9. The differential gear 11 has a role of adjusting a difference between rotations of the right and left drive shafts.

The refrigerant reservoir 12 is formed in the lower portion inside a reduction gear case 8a housing the reduction gear 8. Cooling oil (refrigerant) in the refrigerant reservoir 12 is pumped up by the oil pump 14 driven through the reduction gear 10b and sent to the oil cooler 13 provided outside the reduction gear case 8a. The refrigerant reservoir 12 and the oil pump 14 constitute a refrigerant feedback passage in the reduction gear case.

The driving force of the electric motor 1, which has been adjusted by the reduction gear 8, is transmitted to right and left drive wheels (not shown) through the drive shaft 9 inserted into hollow portions of the motor output shaft 5 and the reduction gear shaft 7.

An end portion of the motor output shaft 5 on the opposite side to the reduction gear 8 penetrates the motor case 2 and protrudes into the resolver chamber (rotation detector chamber) 24 provided adjacent to the motor case 2. The resolver (rotation detector) 15 provided in the resolver chamber 24 detects a rotation direction position of the motor output shaft 5 and the rotor 6. Note that, although the resolver is used as the rotation detector in this embodiment, the rotation detector is not limited to a resolver.

Meanwhile, the axial direction passage 16 for passing the cooling oil through the axial center portion of the drive shaft 9 is extended in the drive shaft 9 in the reduction gear case 8a, and the outlet of the oil cooler 13 and an end of the axial direction passage 16 on the opposite side to the motor are made to communicate with each other.

The diameter direction passages 17 for supplying the cooling oil to the reduction gears 10a and 10b are provided to the path of the axial direction passage 16 in a branching manner.

Moreover, although the other end of the axial direction passage 16 on the motor side is closed, the diameter direction passages 18 branching off at positions just before the closed portion are provided. The diameter direction passages 18 join the axial direction passage 19, which is a cylindrical space sandwiched between the outer circumference of the drive shaft 9 and the inner circumferences of the reduction gear shaft 7 and the motor output shaft 5.

The bearings 20 close both ends of the axial direction passage 19, and the diameter direction passages 21 provided just before the bearing 20 on the resolver chamber 24 side allows the axial direction passage 19 to communicate with the axial direction passage 22 extended in the axial center portion of the drive shaft 9 in the resolver chamber 24.

Both ends of the axial direction passage 22 are closed, and the axial direction passage 22 is made to communicate with the resolver chamber 24 through the diameter direction passages 23 provided on the way thereof.

Furthermore, there is provided the outside refrigerant passage 26 for allowing the lower portion of the resolver chamber 24 and the lower portion of the reduction gear case 8a (refrigerant reservoir 12) to communicate with each other outside the motor case 2.

Here, the flow of the cooling oil in this embodiment will be described by use of the diagram showing the oil flow in FIG. 2.

The cooling oil pumped up by the oil pump 14 from the refrigerant reservoir 12 in the reduction gear case 8a is sent to the oil cooler 13, where the cooling oil is cooled down to a predetermined temperature. Thereafter, the cooling oil flows into the axial direction passage 16 provided in the drive shaft 9 from the end of the axial direction passage 16 on the opposite side to the motor.

The cooling oil that has flown into the axial direction passage 16 goes toward the motor (toward the right in FIG. 1), and part of the cooling oil flows into the diameter direction passages 17 and is sprayed onto the reduction gears 10a and 10b and the differential gear 11 from the axial direction passages 17 by a centrifugal force.

The rest of the cooling oil directly goes along the axial direction passage 16 and flows into the axial direction passage 19 between the drive shaft 9 and the set of reduction gear shaft 7 and motor output shaft 5 from the diameter direction passages 18. The axial direction passages 16 and 19, and the diameter direction passages 18, 21 and 23 correspond to an in-shaft refrigerant passage provided in the reduction gear shaft 7 and the output shaft 5.

The cooling oil sprayed from the diameter passages 17 onto the reduction gears 10a and 10b and the differential gear 11 attaches to the surfaces of the gears to lubricate and cool the gears, and then falls off to the refrigerant reservoir 12 by gravity.

Meanwhile, the cooling oil that has flown into the axial direction passage 19 flows toward the resolver chamber 24 while cooling the rotor 6. When the cooling oil reaches a position just before the bearing 20 on the resolver chamber 24 side, the cooling oil enters the axial direction passage 22 through the diameter direction passages 21 and flows into the resolver chamber 24 through the diameter direction passages 23.

Here, since the resolver chamber 24 and the motor case 2 are hermetically sealed by an oil seal 25, the cooling oil after cooling the rotor 6 returns to the refrigerant reservoir 12 from the inside of the resolver chamber 24 through the outside refrigerant passage 26 without entering the motor case 2.

Then, the cooling oil that has returned to the refrigerant reservoir 12 is pumped up by the oil pump 14 to circulate again through the passages described above.

Note that, although the number of the outside refrigerant passages 26 is set to be just one in this embodiment, the basic flow structure will not be changed even if a plurality of outside refrigerant passages 26 are provided.

According to the embodiment described above, the inside of the motor case 2, which is a circular space surrounded by the motor output shaft 5 and the motor case 2, is separated from the oil circulation passages of the reduction gear 8, the motor output shaft 5 and the resolver chamber 24. Thus, the cooling oil does not enter the motor case 2.

Specifically, the oil seals 25 and 27 are provided on both the end positions where the motor output shaft 5 penetrates the motor case 2, and thus the cooling oil in the reduction gear case 8a and the resolver chamber 24 does not enter the motor case 2.

Moreover, although the cooling oil flows inside the motor output shaft 5, the motor output shaft 5 is formed into a completely cylindrical shape, and thus the cooling oil does not flow out from the inside of the motor output shaft 5 into the motor case 2.

Accordingly, the cooling oil is not brought into contact with the magnets in the rotor 6, and thus it becomes possible to prevent the deterioration of the magnets due to heat from the cooling oil with a high temperature after being used for cooling and the alteration/deterioration of the magnets due to additives and metal foreign objects in the cooling oil.

Moreover, because the cooling oil with a high temperature after cooling the reduction gear 8 and the rotor 6 is not allowed to flow into the motor case 2, it becomes possible to prevent an increase in the temperature of the motor case 2 that is being cooled by a refrigerant supplied by another refrigerant passage due to contact with the cooling oil with the high temperature.

Next, a second embodiment will be described based on FIG. 3. Note that, in the drawings, the same reference numerals will be given to portions similar to those of the first embodiment in the configuration of the cooling system for the electric motor of the vehicle of this embodiment, and repeated description will be omitted.

Figure 3:
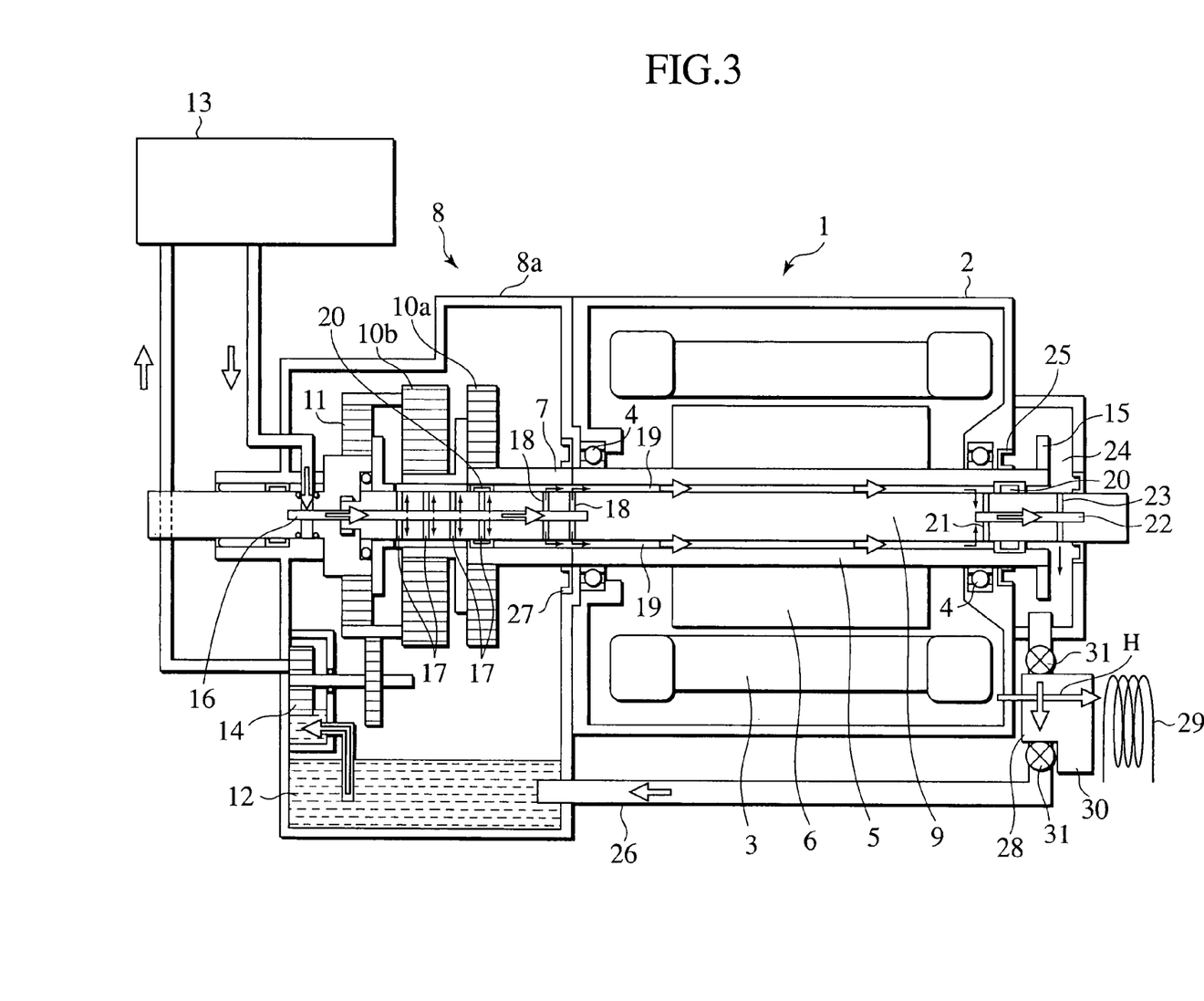
FIG. 3 is a cross-sectional view of an electric motor and a reduction gear in an axial direction in a second embodiment of the present invention.

The second embodiment shown in FIG. 3 is different from the first embodiment shown in FIG. 1 in that the metal foreign object trap 28 using the magnetic force of the stator coils 3 is provided in the outside refrigerant passage 26 in the vicinity of the outlet of the resolver chamber 24.

The metal foreign object trap 28 induces metal foreign objects in the cooling oil into the pocket 30 by the magnetic force H in the direction orthogonal to the flow of the cooling oil, and removes the metal foreign objects from the cooling oil.

In addition, the auxiliary coil 29 is provided for the metal foreign object trap 28. The magnetic force H can be augmented by applying, to the auxiliary coil 29, a current in an opposite phase to a current of a magnetic circuit in the electric motor 1, and thus the metal foreign object can be collected more efficiently.

Figure 4:
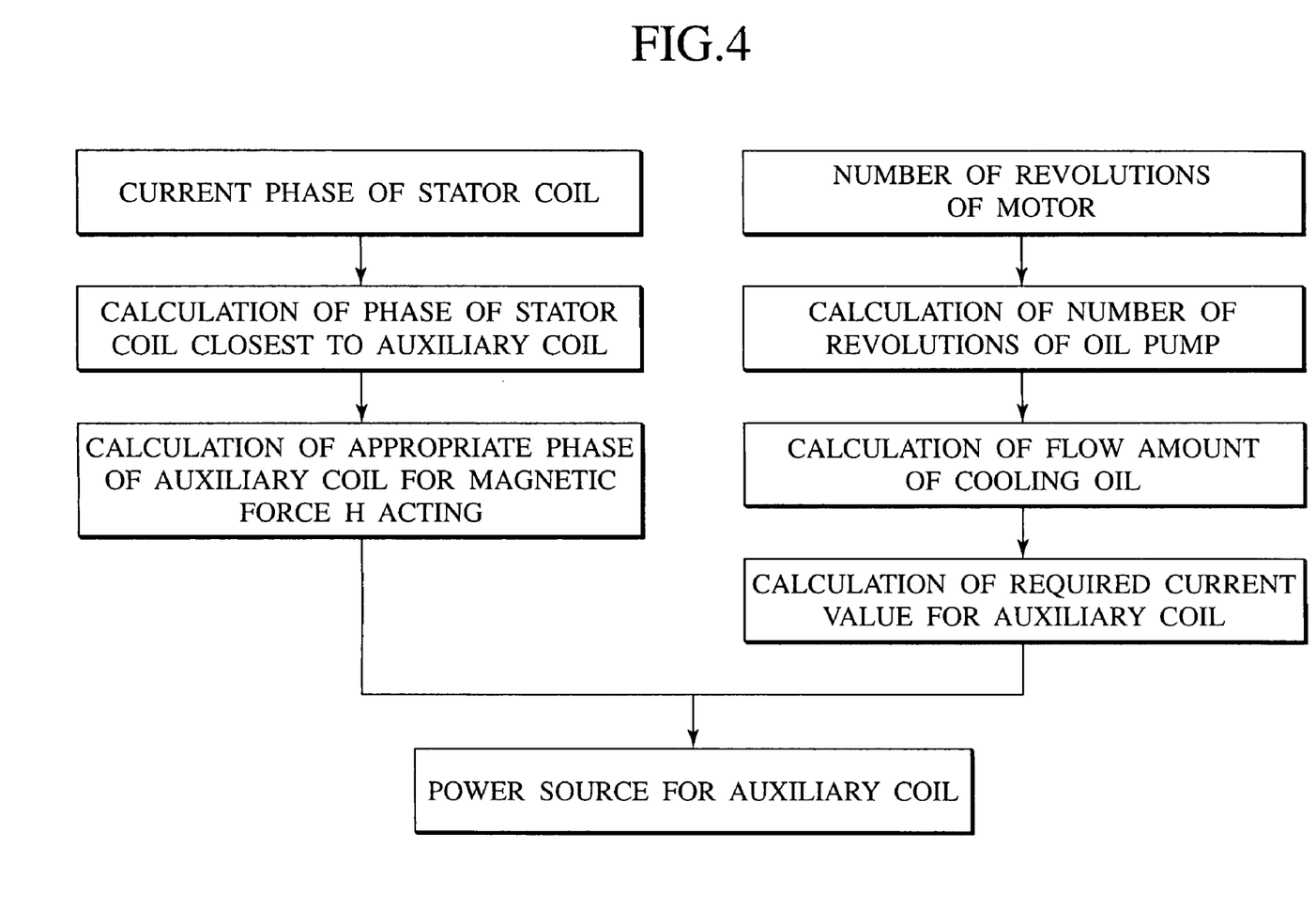
FIG. 4 is a flowchart showing current control of an auxiliary coil in the second embodiment of the present invention.

A current control method of the auxiliary coil 29 is shown in the flowchart of FIG. 4.

First, a phase of the stator coil 3 closest to the auxiliary coil 29 is calculated based on the current phases of the stator coils 3, and a phase of the auxiliary coil 29 is calculated to be appropriate for the magnetic force H acting.

Meanwhile, the number of revolutions of the oil pump 14 is calculated from the number of revolutions of the electric motor 1, the flow amount of the cooling oil is calculated from the number of revolutions of the oil pump 14, and further, a current value required for the auxiliary coil 29 is calculated from the flow amount of the cooling oil.

Thereafter, a power supply to the auxiliary coil 29 is controlled in accordance with the calculated phase and current value.

As described above, the phase of the auxiliary coil 29 is determined based on the phase of the stator coil 3 which is in the vicinity of the trap and has the strongest magnetic force acting on the metal foreign objects, thus making it possible to augment the magnetic force H effectively. Moreover, the current value of the auxiliary coil 29 is determined based on the flow amount of the cooling oil, thus making it possible to collect the metal foreign objects efficiently by allowing the magnetic force H to act thereon in accordance with the flow amount.

In addition, with such a configuration including the metal foreign object trap 28 as in this second embodiment described above, the metal foreign objects can be removed in the cooling passage. Therefore, it is possible to prevent the deterioration of the cooling oil and adhesion of the metal foreign objects onto the members, thus preventing deterioration of the system.

Note that the metal foreign object trap 28 is configured to be detachable from the outside refrigerant passage 26 by providing valves 31 for exchanging the metal foreign object trap in the outside refrigerant passage 26 on both sides of the metal foreign object trap 28. When the metal foreign objects are collected in the pocket 30, the exchange valves 31 on both sides are manually closed, thus making it possible to perform the exchange/maintenance of the metal foreign object trap 28 easily.

Next, a third embodiment will be described based on FIG. 5. Note that, in the drawings, the same reference numerals will be given to portions similar to those of the first embodiment in the configuration of the cooling system for the electric motor of the vehicle of this embodiment, and repeated description will be omitted.

Figure 5:
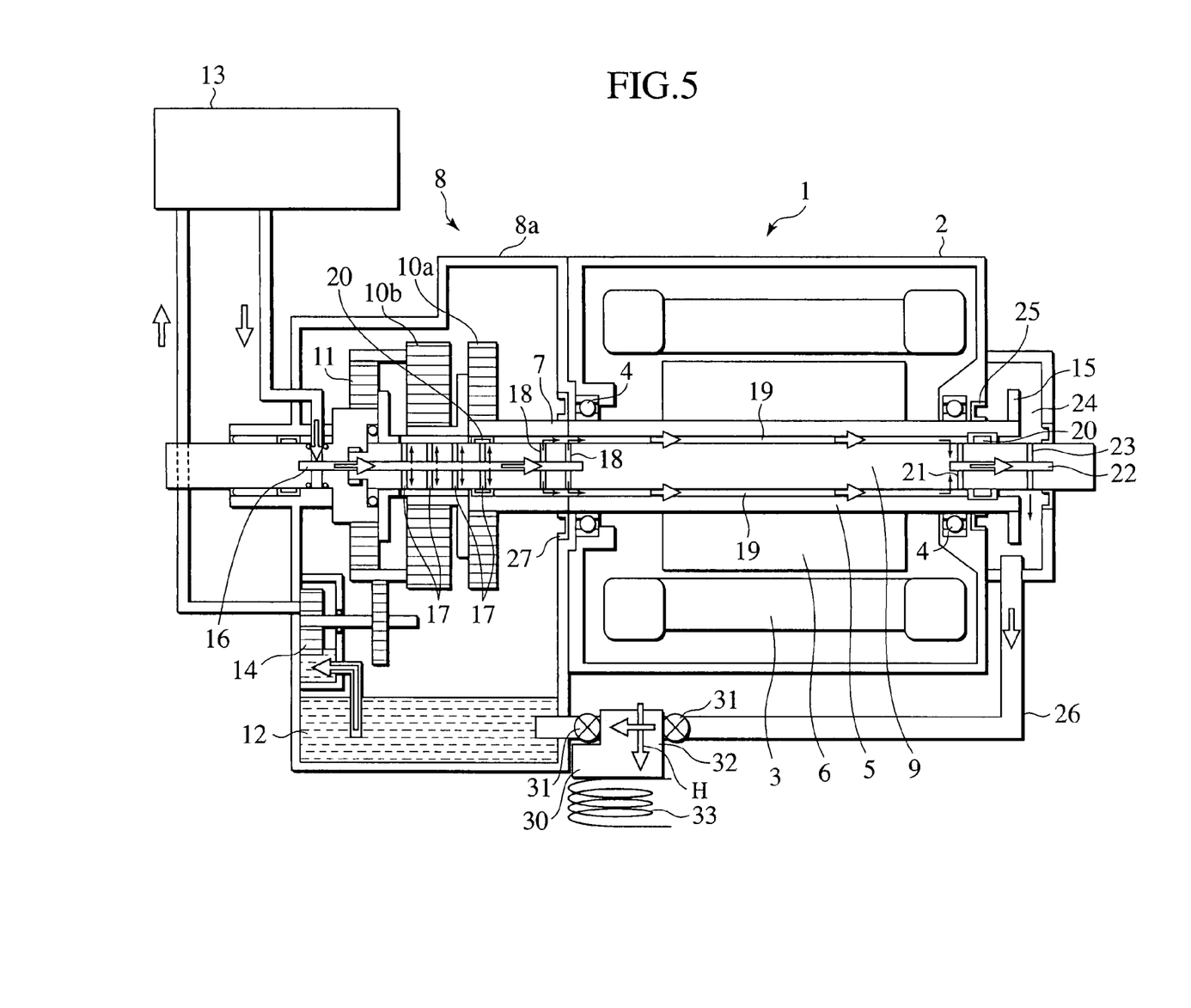
FIG. 5 is a cross-sectional view of an electric motor and a reduction gear in an axial direction in a third embodiment of the present invention.

In the third embodiment shown in FIG. 5, the metal foreign object trap 32 and the auxiliary coil 33, which are similar to those in FIG. 3 described in the second embodiment, are provided in the outside refrigerant passage 26 in the vicinity of the refrigerant reservoir 12.

With the configuration described above, it is made possible not only to trap the metal foreign objects in the cooling oil passages running through the output shaft 5 of the electric motor 1, but also to trap foreign objects falling from the reduction gear 8 side into the refrigerant reservoir 12.

Furthermore, when the viscosity of the cooling oil is high at the time of starting the motor at an extremely low temperature so that a load on the oil pump 14 is increased, only the auxiliary coil 33 is energized to warm the cooling oil by the generated heat, thus making it possible to lower the load on the oil pump 14 at the extremely low temperature and to shorten a period of time required for shifting to a normal drive state.

Next, a fourth embodiment will be described based on FIG. 6. Note that, in the drawings, the same reference numerals will be given to portions similar to those of the first embodiment in the configuration of the cooling system for the electric motor of the vehicle of this embodiment, and repeated description will be omitted.

Figure 6:
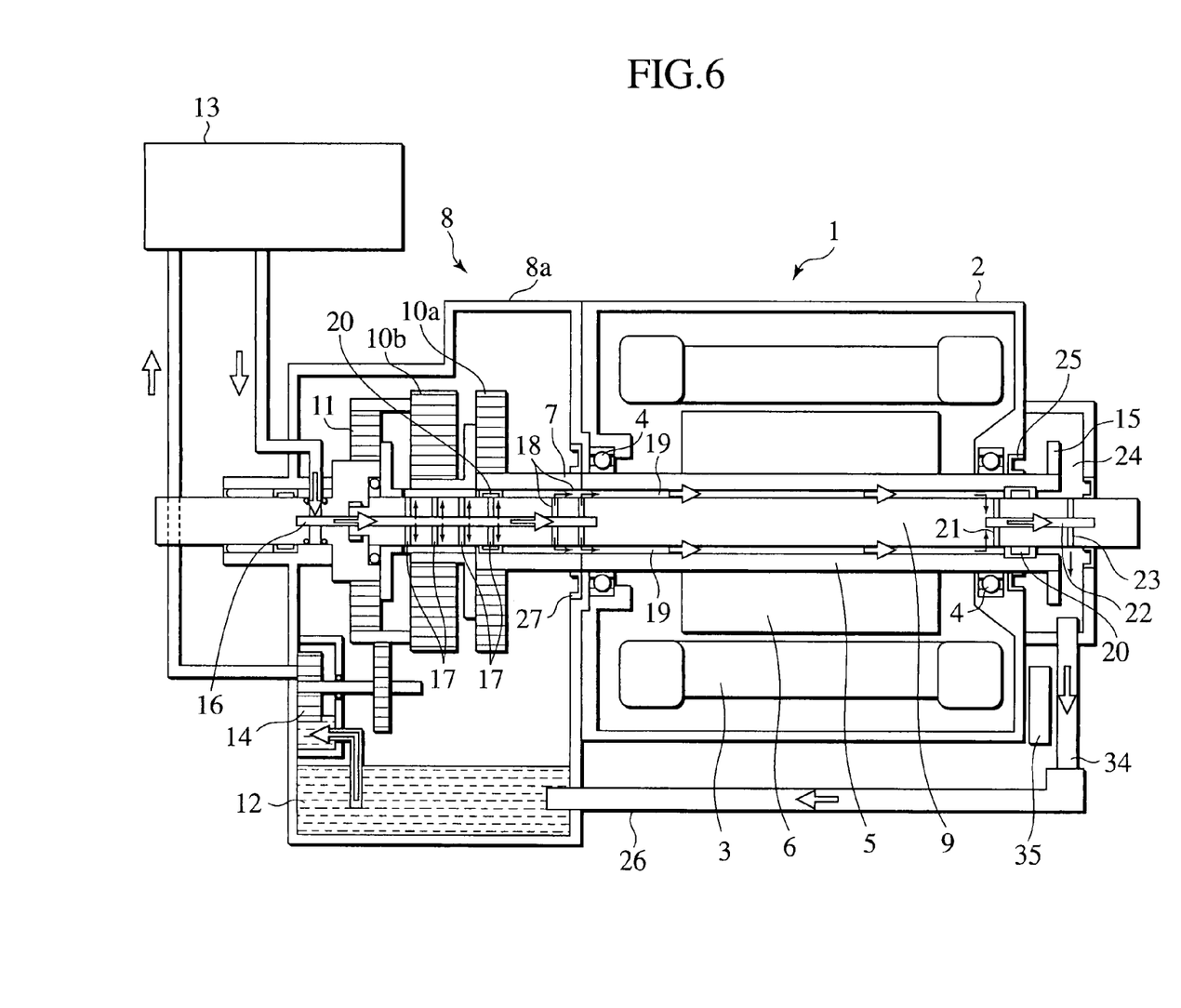
FIG. 6 is a cross-sectional view of an electric motor and a reduction gear in an axial direction in a fourth embodiment of the present invention.

The fourth embodiment shown in FIG. 6 is different from the first embodiment shown in FIG. 1 in that the cooling oil in the outside refrigerant passage 26 can be observed.

Specifically, in the fourth embodiment, a portion of the outside refrigerant passage 26 vertically extended just after the resolver chamber 24, is composed of the transparent tube 34 formed of a transparent material through which an inner state can be viewed from the outside. Furthermore, the luminaire 35 to which power is supplied from the outside is provided behind the transparent tube 34 so that the cooling oil inside the transparent tube 34 can be observed even at night.

With the configuration described above, the presence of dirt and deterioration in the cooling oil can be visually confirmed at any time without adding a special sensor.

Figure 7:
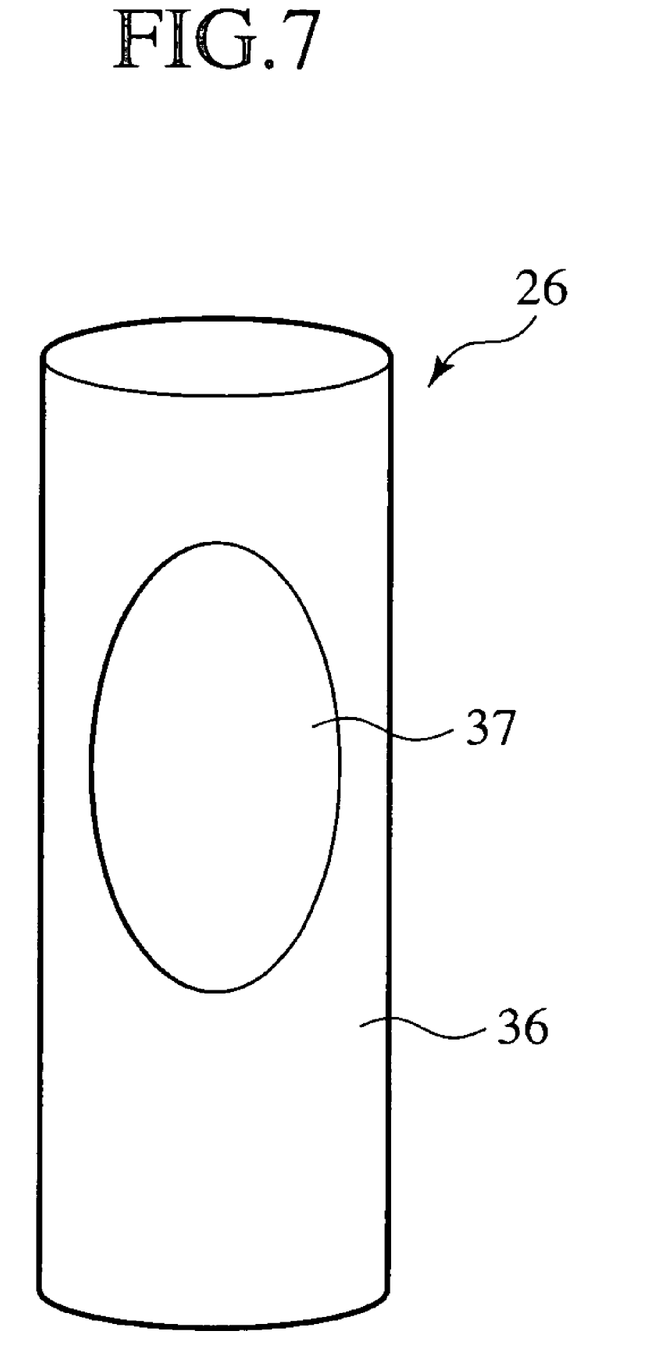
FIG. 7 is a schematic view of a vertical portion of an outside refrigerant passage in the fourth embodiment of the present invention.

Note that, when the outside refrigerant passage 26 is positioned in a well-lit place and a direction of visually observing the outside refrigerant passage 26 is fixed, the transparent window 37 directed in a direction opposite to the visually observing direction may be provided on part of the opaque tube 36 that is the vertical portion of the outside refrigerant passage 26, as shown in FIG. 7.

Furthermore, all of the outside refrigerant passage 26 may be formed of a transparent tube.

The above embodiments have been described in order not to put limitations on the present invention but to facilitate understanding thereof. Hence, the components disclosed in the respective embodiments described above involve all design changes belonging to the technical scope of the present invention.

For example, although the configuration in which the drive shaft 9 is coaxially arranged in the motor output shaft 5 has been described in each of the embodiments, the layout of the drive shaft 9 and the motor output shaft 5 can be appropriately changed in accordance with a structure of a vehicle to which the present invention is applied as long as a configuration in which the shafts of the electric motor 1 and the reduction gear 8 are cooled by a common passage is maintained.

Moreover, the configuration of providing the transparent portion through which the cooling oil inside the outside refrigerant passage 26 can be visually observed as in the fourth embodiment and the configuration including the metal foreign object trap as in the second and third embodiments can be combined to make a configuration including both of the transparent and visually observed portion and the metal foreign object trap. Furthermore, a configuration including both of the metal foreign object trap 28 closer to the resolver chamber 24 as in the second embodiment and the metal foreign object trap 32 closer to the refrigerant reservoir 12 as in the third embodiment can be made.

In the above mentioned embodiments, the axial direction passage 19 is a cylindrical space sandwiched between the outer circumference of the drive shaft 9 and the inner circumferences of the reduction gear shaft 7 and the motor output shaft 5. However, when the refrigerant passage (the axial direction passage 19) is the cylindrical space, it is difficult to ensure a sufficient contact area between the refrigerant and the shafts (the reduction gear shaft 7 and the motor output shaft 5).

Figure 8:
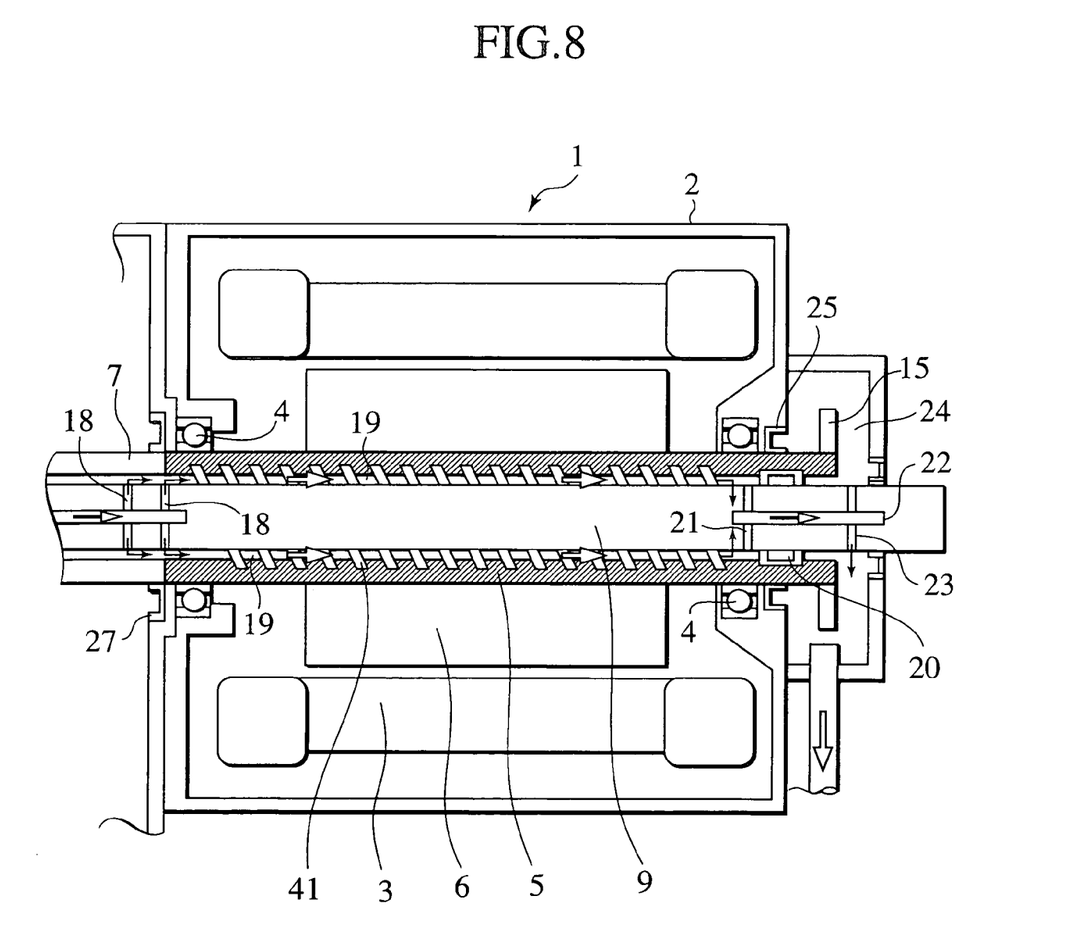
FIG. 8 is an enlarged cross-sectional view of an output shaft of the electric motor in a fifth embodiment of the present invention.

Consequently, in the fifth embodiment as shown in FIG. 8, spiral grooves 41 are formed on an inner wall of the motor output shaft 5. By the way, the constitution of the spiral grooves 41 as shown in FIG. 8 can be applied to the cooling system of any of the embodiments 1 to 4.

As mentioned above, when spiral grooves 41 are formed on the inner wall of the motor output shaft 5, the contact area between the motor output shaft 5 and the refrigerant is increased. Thereby, a heat exchange between the motor output shaft 5 and the refrigerant can occur actively, and a heat quantity transferred from the electric motor 1 to the refrigerant can be increased.

Spiral grooves 41 are formed to be extended to the resolver chamber 24 along a rotating direction of the motor output shaft 5. Thereby, by the rotation of the motor output shaft 5, a propulsive force in the axial direction is added to the refrigerant in the axial direction passage 19 so as to head for the resolver chamber 24.

Therefore, the cooling system of embodiment 5 has the function in which the refrigerant is pressured to be sent to the resolver chamber 24 actively, so that the refrigerant can be circulated effectively.

The entire content of a Japanese Patent Application No. P2002-308567 with a filing date of Oct. 23, 2002 and a Japanese Patent Application No. P2003-341960 with a filing date of Sep. 30, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A cooling system for an electric motor of a vehicle, comprising:
   an electric motor which drives a vehicle;
   a reduction gear which adjusts a driving force of an output shaft of the electric motor and transmits the driving force to a drive shaft;
   an in-shaft refrigerant passage provided in a shaft of the reduction gear and the output shaft of the electric motor;
   a rotation detector chamber which houses a rotation detector for detecting rotations of the output shaft of the electric motor, the rotation detector chamber being provided on an end portion of the output shaft of the electric motor separately from a motor case; and
   an outside refrigerant passage which allows an inside of the rotation detector chamber and a refrigerant feedback passage in a reduction gear case housing the reduction gear to communicate with each other outside the motor case,
   wherein a refrigerant which has passed through the in-shaft refrigerant passage is collected outside a motor case housing the electric motor, and is circulated, and
   the refrigerant is allowed to flow into the rotation detector chamber and is circulated to the refrigerant feedback passage through the outside refrigerant passage.

2. A cooling system for an electric motor of a vehicle according to claim 1,
   wherein at least part of the outside refrigerant passage is formed of a transparent material for visually observing the refrigerant inside.

3. A cooling system for an electric motor of a vehicle according to claim 1,
   wherein the in-shaft refrigerant passage has a function in which the refrigerant is pressured to be sent in an axial direction.

4. A cooling system for an electric motor of a vehicle according to claim 1,
   wherein the in-shaft refrigerant passage has a shape in which heat exchange occurs between the output shaft and the refrigerant.

5. A cooling system for an electric motor of a vehicle according to claim 1,
   wherein spiral grooves are formed on an inner wall of the in-shaft refrigerant passage.

6. A cooling system for an electric motor of a vehicle according to claim 1, further comprising a metal foreign object trap which induces a metal foreign object in the refrigerant into a pocket by a magnetic force of stator coils of the electric motor, the metal foreign object trap being provided to the outside refrigerant passage.

7. A cooling system for an electric motor of a vehicle according to claim 6, wherein
   the refrigerant feedback passage includes a refrigerant reservoir and a pump which pumps the refrigerant in the refrigerant reservoir, and
   the metal foreign object trap is provided in a vicinity of the refrigerant reservoir.

8. A cooling system for an electric motor of a vehicle according to claim 6, wherein
   valves are interposed in the outside refrigerant passage on both sides of the metal foreign object trap, and
   the metal foreign object trap is made detachable from the outside refrigerant passage.

9. A cooling system for an electric motor of a vehicle according to claim 6, wherein an auxiliary coil is provided for the metal foreign object trap, and the magnetic force inducing the metal foreign object into the pocket is augmented by controlling a current applied to the auxiliary coil.

10. A cooling system for an electric motor of a vehicle according to claim 9, wherein a current phase of the auxiliary coil is determined based on a phase of a stator coil closest to the auxiliary coil.

11. A cooling system for an electric motor of a vehicle according to claim 9, wherein a current value of the auxiliary coil is determined in accordance with a flow amount of the refrigerant flowing through the outside refrigerant passage.

12. A cooling system for an electric motor of a vehicle according to claim 9, wherein
   the refrigerant feedback passage includes a refrigerant reservoir and a pump which pumps the refrigerant in the refrigerant reservoir, and
   the metal foreign object trap is provided in a vicinity of the refrigerant reservoir, and when a temperature of the refrigerant is low, only the auxiliary coil is energized in order to heat up the refrigerant by heat of the auxiliary coil.

13. A cooling system for an electric motor of a vehicle, comprising:
an electric motor which drives the vehicle;
a motor case housing the electric motor;
a reduction gear which adjusts a driving force of an output shaft of the electric motor and transmits the driving force to a drive shaft;
an in-shaft refrigerant passage provided in a shaft of the reduction gear and the output shaft of the electric motor;
a rotation detector chamber which houses a rotation detector for detecting rotations of the output shaft of the electric motor, the rotation detector chamber being provided on an end portion of the output shaft of the electric motor separately from the motor case; and
an outside refrigerant passage which allows an inside of the rotation detector chamber and a refrigerant feedback passage in a reduction gear case housing the reduction gear to communicate with each other outside the motor case,
wherein an inside of the motor case is separated from the in-shaft refrigerant passage, and a refrigerant which has passed through the in-shaft refrigerant passage does not enter the motor case, and
the refrigerant is allowed to flow into the rotation detector chamber and is circulated to the refrigerant feedback passage through the outside refrigerant passage.

14. A cooling system for an electric motor of a vehicle according to claim 13 further comprising a metal foreign object trap which induces a metal foreign object in the refrigerant into a pocket by a magnetic force of stator coils of the electric motor, the metal foreign object trap being provided to the outside refrigerant passage.

15. A cooling system for an electric motor of a vehicle according to claim 14, wherein
the refrigerant feedback passage includes a refrigerant reservoir and a pump which pumps the refrigerant in the refrigerant reservoir, and
the metal foreign object trap is provided in a vicinity of the refrigerant reservoir.

16. A cooling system for an electric motor of a vehicle according to claim 14, wherein
valves are interposed in the outside refrigerant passage on both sides of the metal foreign object trap, and
the metal foreign object trap is made detachable from the outside refrigerant passage.

17. A cooling system for an electric motor of a vehicle according to claim 14,
wherein an auxiliary coil is provided for the metal foreign object trap, and the magnetic force inducing the metal foreign object into the pocket is augmented by controlling a current applied to the auxiliary coil.

18. A cooling system for an electric motor of a vehicle according to claim 17, wherein a current phase of the auxiliary coil is determined based on a phase of a stator coil closest to the auxiliary coil.

19. A cooling system for an electric motor of a vehicle according to claim 17, wherein a current value of the auxiliary coil is determined in accordance with a flow amount of the refrigerant flowing through the outside refrigerant passage.

20. A cooling system for an electric motor of a vehicle according to claim 17, wherein
the refrigerant feedback passage includes a refrigerant reservoir and a pump which pumps the refrigerant in the refrigerant reservoir, and
the metal foreign object trap is provided in a vicinity of the refrigerant reservoir, and when a temperature of the refrigerant is low, only the auxiliary coil is energized in order to heat up the refrigerant by heat of the auxiliary coil.

* * * * *